Oct. 3, 1950 — S. K. WHITE — 2,524,554
COVER FOR FRYING PANS
Filed May 1, 1947
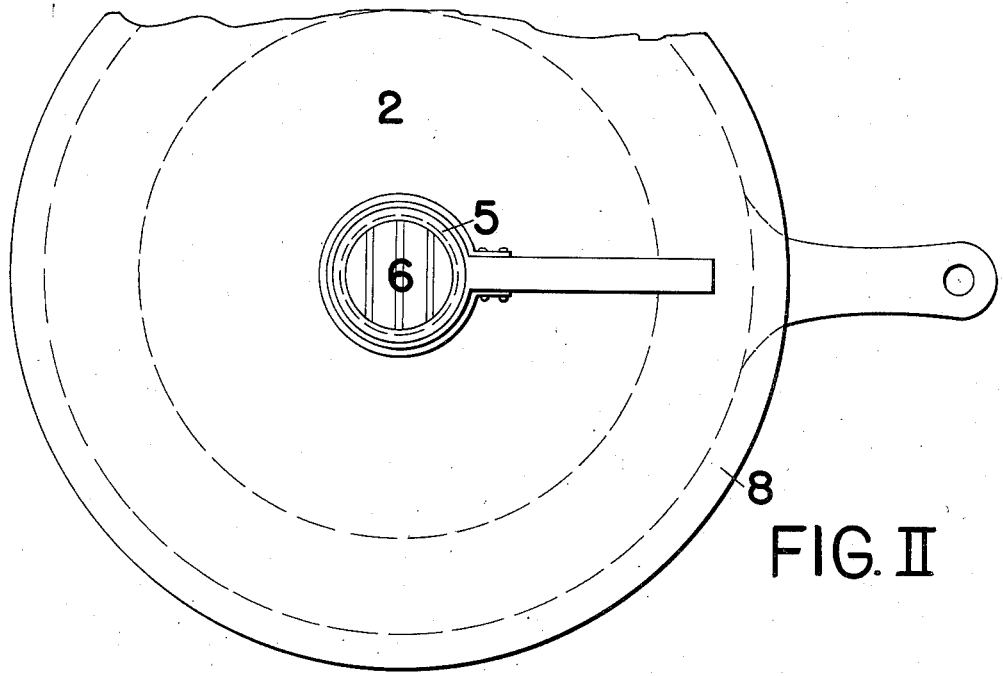
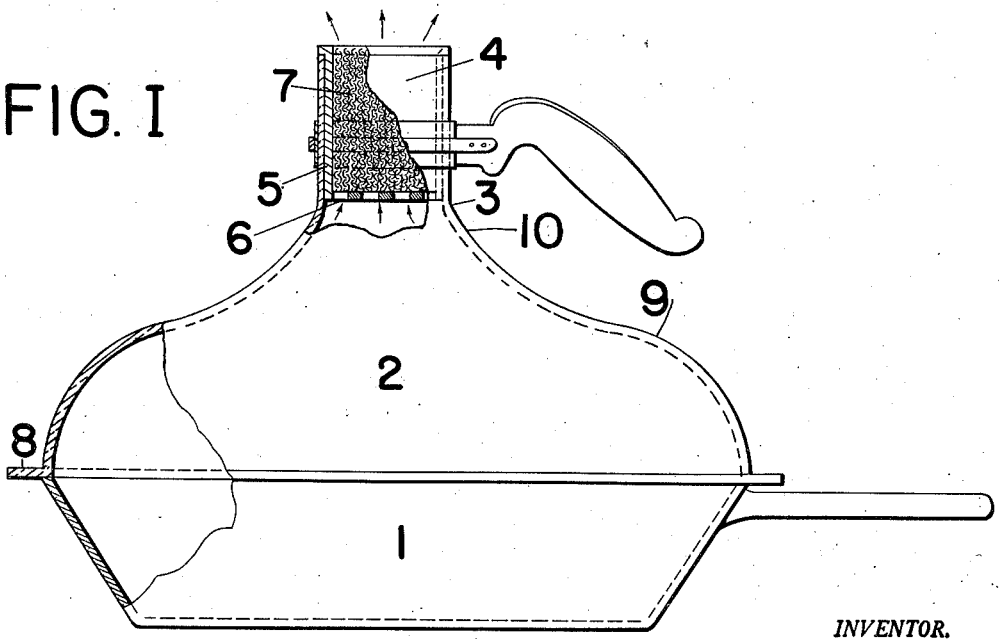
INVENTOR.
Sam. K. White
BY
Lincoln V. Johnson
ATTORNEY Patented Oct. 3, 1950

2,524,554

UNITED STATES PATENT OFFICE 2,524,554

COVER FOR FRYING PANS

Samuel K. White, San Francisco, Calif.

Application May 1, 1947, Serial No. 745,161

3 Claims. (Cl. 183—1)

This invention relates to a cover for frying pans, said cover being of a design which will confine the heat generated for the cooking or frying operation over the material being cooked or fried to accelerate that operation; prevents the spattering of grease or other vaporized waste products onto the stove and or hands and clothes of the cook; permits the escape of water vapor and steam so that the food will be cooked crispy and collects vaporized grease or other waste products which are given off during the cooking or frying operation.

Other objects and advantages will appear from the following description of the invention:

In the accompanying drawings:

Fig. 1 is a side elevation of a frying pan having a cover constructed in accordance with my invention mounted thereon.

Fig. 2 is a plan view of Fig. 1.

In detail the construction illustrated in the drawings consists of a conventional type of frying pan designated by the numeral 1, having a cover 2 thereon of a design constructed in accordance with my invention.

The central wall section 9 of the cover 2 is generally parabolic or elliptical in its vertical cross-section and merges on its top side at 3, by a reverse curve 10, into a stack portion or cylindrical outlet 4. The stack portion 4 has a tube like cylindrical insert or sleeve 5 frictionally telescoped therein. The bottom of the cylindrical insert 5 has a grid 6 arranged therein and on which rests a wad of absorbent material 7, preferably that kind of material known by the trade name of "Gottschalks Metal Sponge".

The open bottom end of the central wall section 9 of the cover 2 has an outstanding perimetral flange 8 which is adapted to support the cover loosely upon the upper edge of the pan 1.

The loose fit design of the cover is such as to allow a flow of air therethrough which is somewhat comparable to the uptake of a furnace or power boiler. The unheated air enters between the upper edge of the pan 1 and flange 8 of the cover 2, gets heated by the food being cooked and rises, along with grease vapors and steam up into the stack or outlet 4, which acts as a chimney. The vaporized grease, steam and other waste products of the cooking operation pass into and through the filter material or means 7 in the process of being discharged to the air. The material 7 collects the grease and other floatable elements and prevents their discharge into the room where the cooking operation is carried on. After one or more cooking operations the grease and other waste products may be removed from the filter material by washing in soapy water or a fresh wad of filter material may be substituted from time to time.

The cover 2 will prevent the spattering of grease during the cooking operation and the resultant accumulation on the walls and ceiling of a kitchen. Steam that is generated during the cooking operation passes directly through the strainer 7 to the air and is not confined within the cover to steam cook the food being fried. Experience has demonstrated that by using the cover during the cooking operation, the food is cooked faster, better and with less fuel than where the cooking operation is performed by usual methods.

Having thus described this invention, what I claim and desire to secure by Letters Patent is:

1. A frying pan cover of unitary construction included in combination a circular relatively wide planar perimetral flange adapted to loosely engage the edge of a pan; a relatively long cylindrical stack portion of relatively small diameter disposed with its lower inlet high above said flange and in coaxial relation thereto; an imperforate wall of generally parabolic form in cross-section extending from the inner edge of said flange and rising directly upwardly with a reverse curve neck portion uniting it with said stack portion; a cylindrical sleeve disposed within said stack and having a foraminous bottom grid disposed adjacent the lower end of said stack, and means positioned therein above said foraminous grid provided with a plurality of passages therein to deflect the vapors passing therethrough and collect grease carried in said vapors; whereby the stack portion, loose engagement of the flange and the direct rise of the wall from the inner edge of the flange provide a flue action to induce a free and gentle flow of incoming air and vapors from food being fried in a pan from the entire area thereof upwardly to the through said stack.

2. The device of claim 1 in which said means positioned above the grid comprises a body of loose straining material.

3. A pan cover adapted for a loose fit on the rim of a cooking pan, said cover having in combination, a radially extending perimetral flange to fit loosely on the rim of a pan to allow air to be drawn in under said flange; a stack portion with its lower inlet spaced high above the flange of said cover; a connecting central wall member which extends between said cover flange and said stack portion, said central wall when viewed in cross-section extending generally upwardly adjacent said cover flange and inwardly to provide a substantial covered free air space above the whole cooking area of a pan so that vapor rising from the moist food will have a free area above the rim of a pan over substantially the whole cooking area of a pan into which to expand so that said vapor will not be confined in the area adjacent the food being cooked; said wall member then being curved upwardly to where it joins to said stack portion whereby steam and other vapors will be induced to move upwardly and out of the pan cover stack by the flue action of the stack; and a foraminous member in said stack and means positioned therein above said member provided with a plurality of passages therein to deflect the cooking vapors passing upwardly in said stack so that grease carried thereby will deposit on said member.

SAMUEL K. WHITE.

REFERENCES CITED

The following references are of record in the file of this patent:

UNITED STATES PATENTS

| Number | Name | Date |
|---|---|---|
| 53,421 | Dembois | Mar. 27, 1866 |
| 950,552 | Milholland et al. | Mar. 1, 1910 |
| 1,368,007 | Zimmermann | Feb. 8, 1921 |